(12) United States Patent
Watarai et al.

(10) Patent No.: US 9,573,654 B2
(45) Date of Patent: Feb. 21, 2017

(54) BICYCLE CONTROLLER

(71) Applicant: Shimano Inc., Sakai-shi, Osaka (JP)

(72) Inventors: Etsuyoshi Watarai, Sakai (JP); Satoshi Shahana, Sakai (JP); Yoshinori Iino, Sakai (JP); Yasuhiro Tsuchizawa, Sakai (JP)

(73) Assignee: Shimano Inc., Sakai-shi (JP)

( * ) Notice: Subject to any disclaimer, the term of this patent is extended or adjusted under 35 U.S.C. 154(b) by 0 days.

(21) Appl. No.: 14/698,764

(22) Filed: Apr. 28, 2015

(65) Prior Publication Data

US 2016/0318583 A1    Nov. 3, 2016

(51) Int. Cl.
*G06F 19/00* (2011.01)
*B62M 25/08* (2006.01)
*B62K 23/00* (2006.01)

(52) U.S. Cl.
CPC .............. *B62M 25/08* (2013.01); *B62K 23/00* (2013.01)

(58) Field of Classification Search
CPC ............ B62M 6/45; B62M 6/40; B62M 6/85; B62M 6/90

USPC ........... 701/99; 318/3; 310/67 A, 67 R, 68 R
See application file for complete search history.

(56) References Cited

U.S. PATENT DOCUMENTS

| 8,983,704 B2 * | 3/2015 | Schieffelin | ............... B62M 6/45 |
| | | | 180/205.1 |
| 2010/0019676 A1 * | 1/2010 | Yen | ........................... B62J 6/12 |
| | | | 315/78 |

FOREIGN PATENT DOCUMENTS

| JP | 1067377 A | 3/1998 | |
| JP | EP 2783970 A1 * | 10/2014 | ............ B60L 11/007 |
| JP | 2014208522 A | 11/2014 | |

\* cited by examiner

*Primary Examiner* — Thomas G Black
*Assistant Examiner* — Luke Huynh
(74) *Attorney, Agent, or Firm* — Alleman Hall McCoy Russell & Tuttle LLP

(57) ABSTRACT

A bicycle motor control system is provided. The bicycle motor control system may be configured to control a drive motor that configured to output a driving force. The controller may be configured to receive a first user input and increase the driving force based on the first user input so as to set a boost ratio, and automatically reduce the driving force based on a factor other than the first user input.

20 Claims, 7 Drawing Sheets

| Embodiment | Assist Mode | Assist Level | Boost Ratio | 2nd Boost Ratio |
|---|---|---|---|---|
| 1st | On | A1 | B1 (B1>A1) | N/A |
| 2nd | On | A1 | B1 (B1>A1) | B2 (B2>B1) |
| 3rd | High | A1 | B1 (B1>A1) | N/A |
| 3rd | Normal | A2 | B1 (B1>A1) | N/A |
| 3rd | Eco | A3 | B1 (B1>A1) | N/A |
| 4th | High | A1 | B1 (B1>A1) | A1 |
| 4th | Normal | A2 | B1 (B1>A1) | A1 |
| 4th | Eco | A3 | B1 (B1>A1) | A1 |

FIG. 5A

| Embodiment | Assist Mode | Assist Level | Boost Ratio | 2nd Boost Ratio |
|---|---|---|---|---|
| 5th | High | A1 | B1 (B1>A1) | B2 (B2>B1) |
| | Normal | A2 | B1 (B1>A1) | B2 (B2>B1) |
| | Eco | A3 | B1 (B1>A1) | B2 (B2>B1) |
| 6th | High | A1 | A1XN (N>1, N is an integer) | N/A |
| | Normal | A2 | A2XN (N>1, N is an integer) | N/A |
| | Eco | A3 | A3XN (N>1, N is an integer) | N/A |
| 7th | High | A1 | B1 (B1>A1) | N/A |
| | Normal | A2 | A1 | N/A |
| | Eco | A3 | A2 | N/A |

FIG. 5B

| Embodiment | Assist Mode | Assist Ratio | Boost Ratio | 2nd Boost Ratio |
|---|---|---|---|---|
| 8th | High | A1 | B1 (B1>A1) | N/A |
|  | Normal | A2 | B1 (B1>A1) | N/A |
|  | Eco | A3 | A1 | N/A |
| 9th (walk mode) | High | A1 | B1 (B1>A1) | Walk mode |
|  | Normal | A2 | B1 (B1>A1) | Walk mode |
|  | Eco | A3 | B1 (B1>A1) | Walk mode |
| 10th (walk mode) | On | A1 | B1 (B1>A1) | Walk mode |

FIG. 5C

BICYCLE CONTROLLER

BACKGROUND

Electric drive assisted bicycles with a boost switch have been previously disclosed. The boost switch is provided for increasing the driving force from a drive motor of a drive assisted bicycle while the boost switch is continuously operated by a rider. The driving force is easily increased when the boost switch is continuously activated, allowing a rider to concentrate on riding while the driving force is easily changed. However, prior art systems do not provide a convenient system for the rider to concentrate on riding.

SUMMARY

According to a first aspect of the invention, a bicycle motor control system comprises a controller configured to control a drive motor that is configured to selectively output driving force. The controller is configured to receive a first user input and increase the driving force based on the first user input so as to set a boost ratio, and automatically reduce the driving force based on a factor other than the first user input. One potential advantage of this configuration is that driving force may be appropriately provided according to a user's preferences and automatically reduced without active intervention from the user.

In this aspect, the factor is at least one of time, a travel distance of the bicycle, and a number of rotations of a crank shaft. One potential advantage of this configuration is that driving force may be appropriately reduced according to a user's preferences.

In this aspect, the controller is configured to control the drive motor to output the driving force in accordance with a manual drive force. One potential advantage of this configuration is that the drive motor may selectively output driving force that is appropriate for the pedal power of a user operating the bicycle.

In this aspect, the controller is configured to receive a second user input to set an assist ratio from a plurality of assist ratios based on the second user input, and maintain the assist ratio set by the second user input. One potential advantage of this configuration is that driving force may be appropriately provided according to a user's preferences.

In this aspect, the controller is configured to change the assist ratio when the controller receives the second user input or the first user input after maintaining the assist ratio. One potential advantage of this configuration is that the user has an option of changing the assist ratio after setting an initial assist ratio.

In this aspect, the bicycle motor control system further comprises at least a first operation switch, and a second operation switch. The controller is configured to receive the first user input by operating the first operation switch and to receive the second user input by operating the second operation switch. One potential advantage of this configuration is that the user may easily select a boost ratio and an assist ratio using operation switches.

In this aspect, the controller sets the boost ratio so that the boost ratio is higher than a highest assist ratio among the plurality of assist ratios. One potential advantage of this configuration is that the user may easily boost the output of driving force by selecting a boost ratio over an assist ratio.

In this aspect, the first user input includes a first boost input and a second boost input, the controller sets a first boost ratio in response to the first boost input and sets a second boost ratio in response to the second boost input, where the second boost ratio is greater than the first boost ratio. One potential advantage of this configuration is that the user may select between two boost ratios according to the user's preference.

In this aspect, the bicycle motor control system further comprises a lever. One potential advantage of this configuration is that the user may easily select a boost ratio by using a finger.

In this aspect, the lever is operable through a first angular range to generate the first boost input and operable through a second angular range greater than the first angular range to generate the second boost input. One potential advantage of this configuration is that the user may easily select a boost ratio by using a finger.

In this aspect, the first boost ratio depends on an assist ratio maintained by the controller just before receiving the first user input. One advantage of this configuration is that the first boost ratio can be ensured to be greater than assist ratio and appropriate to the selected assist mode.

In this aspect, the first boost ratio is an assist ratio multiplied by N, wherein N>1 and N is an integer. One advantage of this configuration is that the increase in the output of driving force may be configured to be an appropriate amount.

In this aspect, the controller selectively changes a first assist ratio to the boost ratio when the controller receives the first user input in a state in which the controller maintains the first assist ratio. The controller selectively changes a second assist ratio to the first assist ratio when the controller receives the first user input in a state in which the controller maintains the second assist ratio. The boost ratio is greater than the first assist ratio, and the first assist ratio is greater than the second assist ratio. One potential advantage of this configuration is that driving force may be appropriately increased or decreased according to a user's preferences.

In this aspect, the first user input is wirelessly transmitted to the controller. One potential advantage of this configuration is that the placement of the first operating device and the controller on the bicycle can be flexible.

In this aspect, the controller communicates with the drive motor via a wired connection. One potential advantage of this configuration is that the wired connection between the controller and the drive motor is less vulnerable to electromagnetic interference.

In this aspect, the controller includes a memory which records information about the boost ratio and an assist ratio. One potential advantage of this configuration is that the user may save boost ratio and assist ratio settings to retrieve in later cycling sessions. One potential advantage of this configuration is that the user may set boost ratio settings and/or assist ratio settings via a computer.

In another aspect, a bicycle motor control system comprises a controller configured to control a drive motor that is configured to output a driving force. The controller is further configured to increase the driving force based on a first user input so as to set a boost ratio in a first state, and configured to control an electric component without setting the boost ratio in a second state that is different from the first state based on the first user input. One potential advantage of this configuration is that the user has an option to switch from a boost ratio to an assist ratio, in which driving force is provided at a level that assists the user in walking the bicycle.

In this aspect, the controller is configured to receive a second user input, to set an assist ratio from a plurality of assist ratios based on the second user input, and to maintain the assist ratio set by the second user input. One potential advantage of this configuration is that driving force may be appropriately provided according to a user's preferences.

In this aspect, the controller sets the boost ratio so that the boost ratio is higher than a highest assist ratio among the plurality of assist ratios. One potential advantage of this configuration is that the user may easily boost the output of driving force by selecting a boost ratio over an assist ratio.

In this aspect, the controller is configured to control the drive motor to output a predetermined driving force in the second state. One potential advantage of this configuration is that there is an option to provide driving force at a level that assists the user in walking the bicycle.

In this aspect, the first state corresponds to a state in which the user is applying manual drive force, and the second state corresponds to a state in which the user is not applying manual drive force and the controller determines that a speed of a wheel of the bicycle is below a predetermined speed. One potential advantage of this configuration is that the user has an option to switch from a boost ratio to an assist ratio, in which driving force is provided at a level that assists the user in walking the bicycle.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The present disclosure is illustrated by way of example and not by way of limitation in the figures of the accompanying drawings, in which the like reference numerals indicate like elements and in which:

FIG. 5A is a table illustrating first, second, third, and fourth embodiments of the electronic assist mode configurations of the present invention.

FIG. 5B is a table illustrating fifth, sixth, and seventh embodiments of the electronic assist mode configurations of the present invention.

FIG. 5C is a table illustrating eighth, ninth, and tenth embodiments of the electronic assist mode configurations of the present invention.

FIGS. 1 and 3 are drawn approximately to scale unless otherwise indicated; however, other relative dimensions may be used, if desired.

DETAILED DESCRIPTION

A selected embodiment of the present invention will now be described with reference to the accompanying drawings.

It will be apparent to those skilled in the art from this disclosure that the following description of an embodiment of the invention is provided for illustration only and not for the purpose of limiting the invention as defined by the appended claims and their equivalents.

Figure 1:
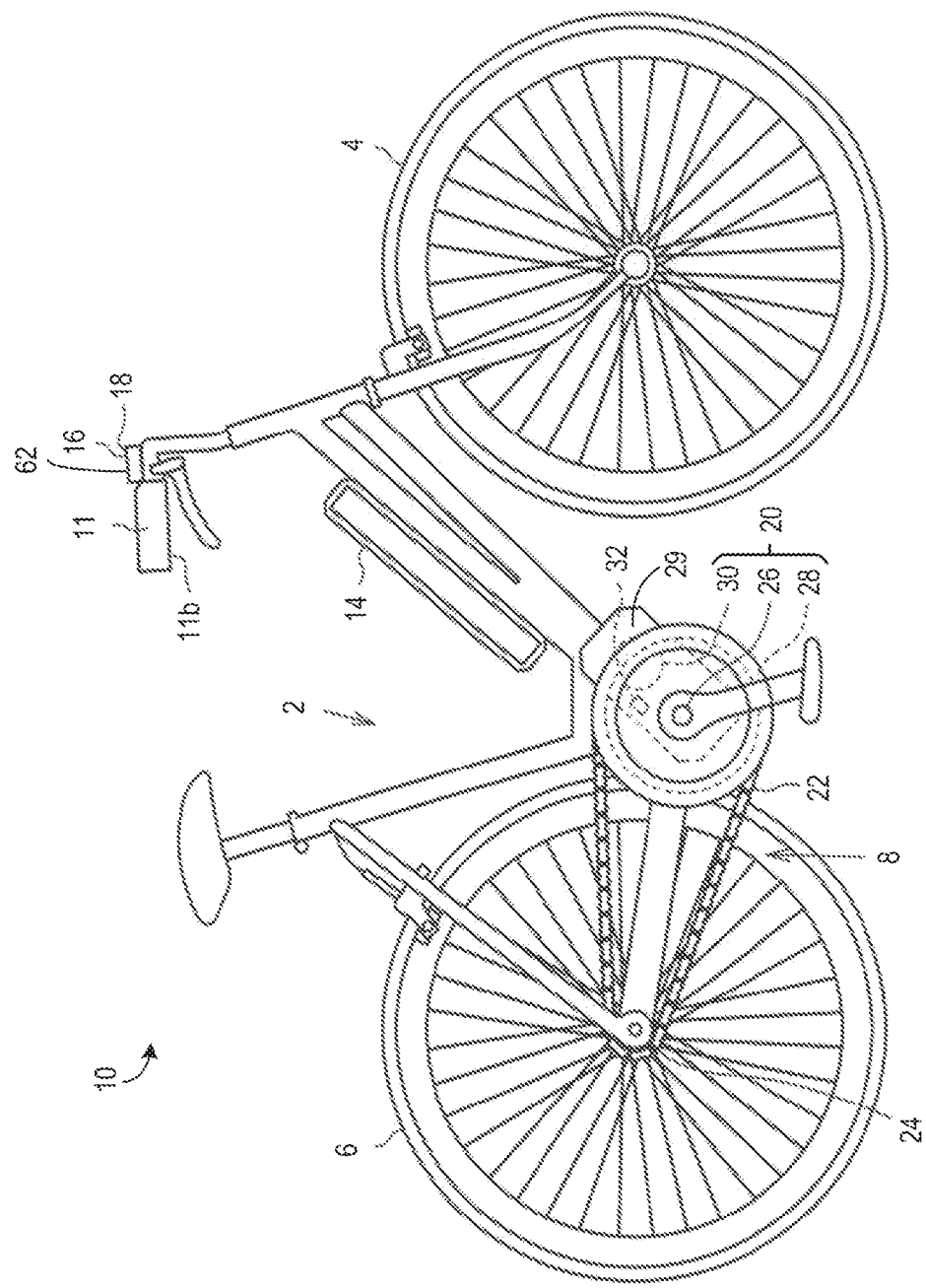
FIG. 1 illustrates a bicycle motor control system according to one embodiment of the present invention.

Referring initially to FIG. 1, a bicycle motor control system 10 is provided according to one disclosed embodiment of the present invention. A drive assisted bicycle, configured to be driven by leg power of a user, is provided with a frame 2, wheels (front wheel 4 and rear wheel 6) that are arranged to be rotatable on the frame 2, a drive assist mechanism 8 to provide driving force to the rear wheel 6, a battery 14, a controller 32, and a display 18.

The controller 32, display 18, a first operating device 62, and a second operating device 16 may be affixed to the handlebar of the bicycle. The controller 32 is configured to control a drive motor 30 that is configured to selectively output driving force to a wheel of a bicycle, outputting the driving force in accordance with a manual drive force. The manual drive force derives from the pedal power of a user operating the bicycle. The battery 14 may be affixed to a rear carrier (not shown), a frame 2, or both the rear carrier and the frame 2. The battery 14 provides electrical power to the drive assist mechanism 8.

The drive assist mechanism 8 is equipped with a crank portion 20, a chain 22 to transmit power from the crank portion 20, and a rear sprocket 24 that is driven by chain 22 and is arranged on the axis of the rear wheel. The crank portion 20 is equipped with a crank shaft 26, a front sprocket 28 that transmits rotational power from the crank shaft 26 to the chain 22, and a drive unit 29 with a drive motor 30 that provides drive assist to the rear wheel. The crank shaft 26 and the front sprocket are rotatable supported by the drive unit 29. The drive unit 29 is fixed on the frame 2.

The rotational power of the crank shaft 26 is transmitted to the front sprocket 28 through the one-way clutch. The one-way clutch does not allow the rotational power of the crank shaft 26 to transmit to the front sprocket 28 when the crank shaft 26 rotates in a rearward (or counter-clockwise) direction, while allowing the rotational power of the crank shaft 26 to transmit to the front sprocket 28 when the crank shaft 26 rotates in a forward (or clockwise) direction. Rotation in a forward direction is defined as the rotational direction of the crank shaft 26 when the drive assisted bicycle moves in a forward direction. In other embodiments, a one-way clutch may not be provided in the transmission pathway between the crank shaft 26 and the front sprocket 28, in which case a user may operate a coaster brake that is provided on the hub of the rear wheel.

The rotational power of the drive motor 30 is transmitted to the chain through a deceleration mechanism. The deceleration mechanism, comprising a combination of multiple gears, provides output to the front sprocket 28 to slow the rotational speed of the axis of the drive motor 30. A transmission mechanism with multi speed stages may be disposed between the crank shaft 26 and the front sprocket 28 in the drive unit 29, or in a rear hub of the rear wheel 6 as an internal gear hub, or on a rear end of the frame 2 as a rear derailleur.

Figure 2:
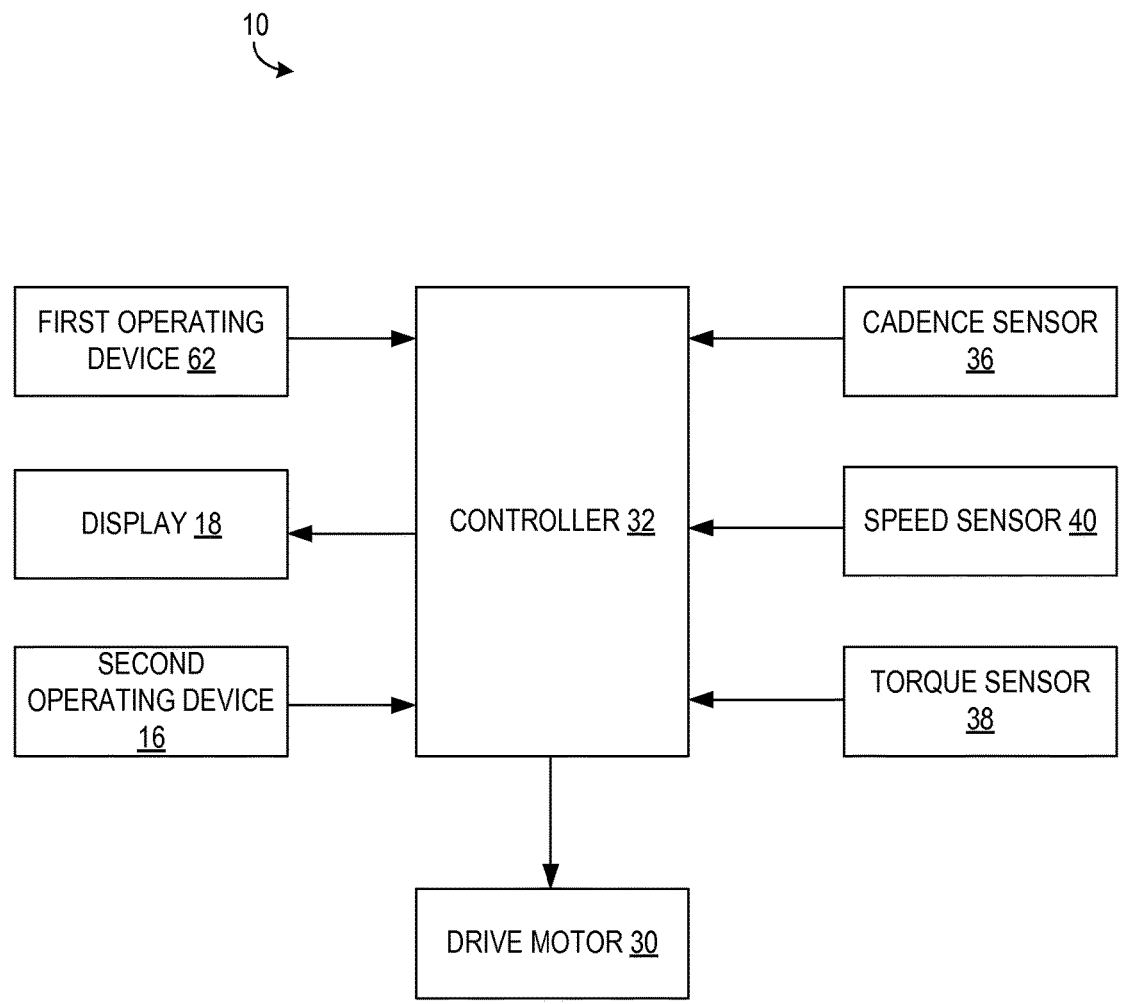
FIG. 2 is a block diagram relating to a controller, a first operating device, display, second operating device, cadence sensor, torque sensor, and speed sensor, in accordance with an embodiment of the present disclosure.

Referring to FIG. 2, the bicycle motor control system 10 comprises a controller 32, a first operating device 62, and a second operating device 16. The controller 32 is configured to receive a second user input from the second operating device 16, which is communicatively coupled to the controller 32, to set an assist ratio from the plurality of assist ratios based on the second user input, and maintain the assist ratio set by the second user input. The controller 32 includes a memory which records information about a boost ratio and an assist ratio, a processor, and an inverter for activating a drive motor 30. The memory is preferably non-volatile. The controller 32 is communicatively coupled with a drive motor 30 and display 18. In certain embodiments, the controller 32 may communicate with the drive motor 30 via a wireless connection, while in other embodiments, the controller 32 may communicate with the drive motor 30 via a wired connection. In some embodiments, the bicycle motor control system 10 may comprise at least a first operation switch as a first operating device 62 and a second operation switch as a second operating device 16. The controller may be configured to receive the first user input by operating the first operation switch and to receive the second user input by operating the second operation switch.

A first operating device 62, configured to transmit a first user input to the controller 32, is communicatively coupled to the controller 32 to send signals that correspond to the first user input. In response, the controller 32 is configured to receive the first user input and increase the driving force based on the first user input so as to set a boost ratio, and automatically reduce the driving force based on a factor other than the first user input. The controller 32 may reduce the driving force automatically to the assist ratio before the first user input is received, or reduce the driving force to an assist ratio that is higher than the assist ratio before the first user input was received by the controller 32. For example, when the controller 32 receives the first user input in the normal assist mode, the controller 32 increases the driving force to a boost ratio that is higher than the driving force in the high assist mode, then the controller 32 automatically reduces the driving force to a driving force that corresponds to the high assist mode. The factor may be at least one of time, a travel distance of the bicycle, and a number of rotations of a crank shaft 26. In some embodiments, the controller 32 sets the boost ratio so that the boost ratio is higher than the highest assist ratio among a plurality of assist ratios. The first user input may be wirelessly transmitted to the controller, or transmitted via a wired connection.

The controller 32 of the bicycle is configured to receive input from a cadence sensor 36, torque sensor 38, and speed sensor 40 that are communicatively coupled with the controller 32. The cadence sensor 36 is provided on the crank portion 20, and detects the rotations of a crank shaft 26. For example, the cadence sensor 36 may comprise a sensor that detects a magnet that is affixed to a crank arm.

The torque sensor 38 is also provided on the crank portion 20. Along the transmission pathway between the crank shaft 26 and the front sprocket 28, power transmission parts are provided to transmit the rotational power of the crank shaft 26 to the front sprocket 28. The torque sensor 38 detects the torque from the power transmission parts. The torque corresponds to the pedal power that is exerted on the pedals of the drive assisted bicycle.

The speed sensor 40 is provided on a chain stay of the frame 2, and detects the rotational speed of the rear wheel. For example, the speed sensor 40 may detect a magnet that is affixed to the rear wheel. The controller 32 may calculate the torque based on a signal that is sent by the torque sensor 38, and may calculate a speed of the drive assisted bicycle based on a signal that is sent by the speed sensor 40. The calculated results may be shown on the display 18. The controller 32 defines the target drive assist ratio based on the calculated speed and torque, and is configured to reduce the predetermined assist ratio or boost ratio of the bicycle according to input from at least a torque sensor 38 and a speed sensor 40 that are electronically coupled to the controller. In other embodiments, the controller 32 is configured to reduce the predetermined assist ratio or boost ratio according to input from at least a cadence sensor 36. The target assist power may be defined by a predefined map.

The predefined map regulates the assist ratio regarding bicycle speeds. The assist ratio is defined as the ratio of a user's pedal power versus the power provided by the drive motor 30. The predefined map is configured for each predetermined electronic assist mode. In other embodiments, instead of a predefined map, an equation may define the target drive assist ratio.

The electronic assist modes include a high assist mode (first assist mode), a normal assist mode (second assist mode), an eco assist mode (third assist mode), and an off mode. In other embodiments, the electronic assist modes may only include an on mode and an off mode. In the off mode, the drive motor 30 does not provide assist power. High assist mode is an electronic assist mode that provides greater assist power than at normal assist mode within a predetermined speed range. Eco assist mode is an electronic assist mode that provides less assist power than at normal assist mode within a predetermined speed range.

Figure 3:
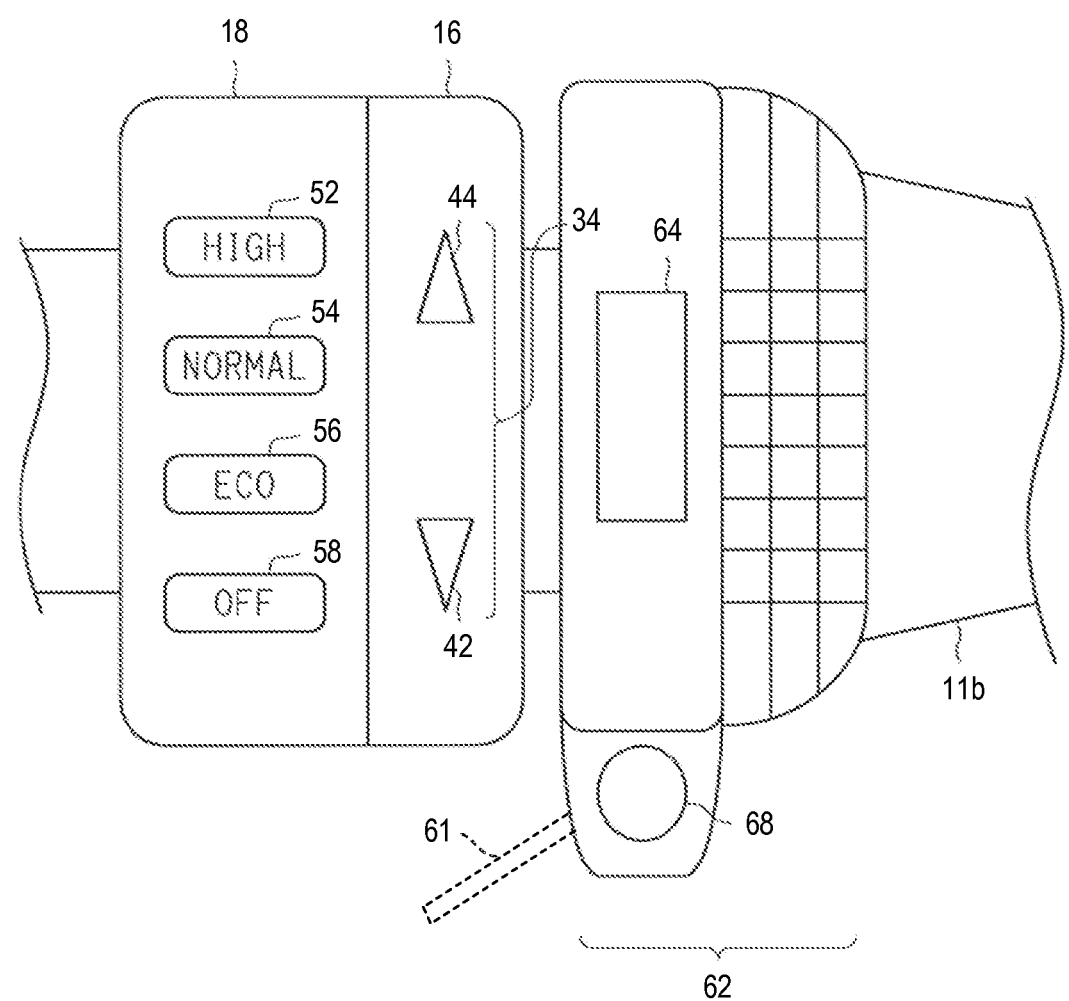
FIG. 3 illustrates a first user operating device, second operating device, and display of a bicycle motor control system according to one embodiment of the present invention.

Referring to FIG. 3, a display 18 is depicted. For example, the display 18 may be arranged on the proximate, left-hand side of the right-hand grip 11b of the handlebar 11. The display 18 is provided with display lights. The first display light 52 illuminates when the electronic assist mode is set at high assist mode. The second display light 54 illuminates when the electronic assist mode is set at normal assist mode. The third display light 56 illuminates when the electronic assist mode is set at eco assist mode. The fourth display light 58 illuminates when the electronic assist mode is set at off mode. The display 18 may comprise an LED display apparatus or liquid display. When the display 18 comprises a liquid display, the display lights may be replaced with labels consisting of characters on the display 18, so that the labels are readily distinguishable from one another.

Referring to FIG. 3, a second operating device 16 is provided. The electronic assist mode of the drive motor 30 is switched by a user operating the input portion 34. The second operating device 16 is provided proximate to the grip. For example, the second operating device 16 may be provided adjacent to the display 18, proximate to a left-hand grip or a right-hand grip 11b. The input portion 34 comprises the first operation switch 42 and the second operation switch 44. The switches may comprise, for example, push button switches, touch switches, or slide switches. When the second operating device 16 is affixed to the handlebar 11, the first operation switch 42 is arranged at a lower position than the second operation switch 44.

When the first operation switch 42 and the second operation switch 44 are operated, they output operation signals to the controller 32, sending operation signals with each push, touch, or slide operation. The controller 32 receives operation signals from the first operation switch 42 and second operation switch 44, and in response, switches the electronic assist mode of the drive motor 30 according to the operation signals. In principle, when the controller 32 receives an operation signal from the first operation switch 42, the controller 32 switches the drive motor 30 to an electronic assist mode that provides a weaker assist power. For example, if the current electronic assist mode is high assist mode, the controller 32 switches the drive motor 30 to normal assist mode. If the current electronic assist mode is normal assist mode, the controller 32 switches the drive motor 30 to eco assist mode. If the current electronic assist mode is eco assist mode, the controller 32 switches the drive motor 30 to off mode.

Conversely, when the controller 32 receives an operation signal from the second operation switch 44, the controller 32 switches the drive motor 30 to an electronic assist mode that provides a stronger assist power. For example, if the current electronic assist mode is off mode, the controller 32 switches the drive motor 30 to eco assist mode. If the current electronic assist mode is eco assist mode, the controller 32 switches the drive motor 30 to normal assist mode. If the current electronic assist mode is normal assist mode, the controller 32 switches the drive motor 30 to high assist mode.

Referring to FIG. 3, a first operating device 62 is provided. The first operating device 62 is switched by a user operating the boost switch 68. The first operating device 62 is provided proximate to the grip. For example, the first operating device 62 may be provided proximate to a left-hand grip or a right-hand grip 11b. The boost switch 68 may comprise, for example, a push button switch, touch switch, or slide switch. The first operating device 62 may be preferably affixed to a position on the handlebar 10 that is within reach of a user's thumb when the handlebar 11 is gripped by the user. Thus, the user may operate the first operating device 62 while gripping the handlebar 11. In this embodiment, the first operating device 62 is affixed proximate to the right-hand grip 11b. The first operating device 62 may be formed integrally with the display 18 and the second operating device 16, or formed separately away from the display 18 and the second operating device 16. In some embodiments, the bicycle motor control system 10 may further comprise a lever. Specifically, the first operating device 62 may include a lever 61 which may be operable through a first angular range to generate the first boost input and is operable through a second angular range greater than the first angular range to generate the second boost input.

With reference also to FIG. 2, when the controller 32 receives input from at least a torque sensor 38 and a speed sensor 40 that are electronically coupled to the controller 32, and determines that the speed of the wheel is below a predetermined speed and the torque of the wheel is below a predetermined torque, then the controller 32 is configured to selectively reduce the driving force of the drive motor 30 to a predetermined walk level, in a walk mode, in response to receiving the first user input. Accordingly, the activation of the walk mode may be indicated on a display 18 or 64. When the drive motor 30 is operating in the walk mode, it is preferable to forcibly stop the drive motor when at least a predetermined load is sensed on the drive motor 30. It is preferable for the controller 32 to gradually decrease a target torque level or target drive assist ratio of the drive motor 30 in response to a signal to forcibly stop the drive motor. This way, when a user is walking the drive assisted bicycle, it will be easy for a user to stop or start the bicycle with a simple push or a nudge against the bicycle.

Figure 4:
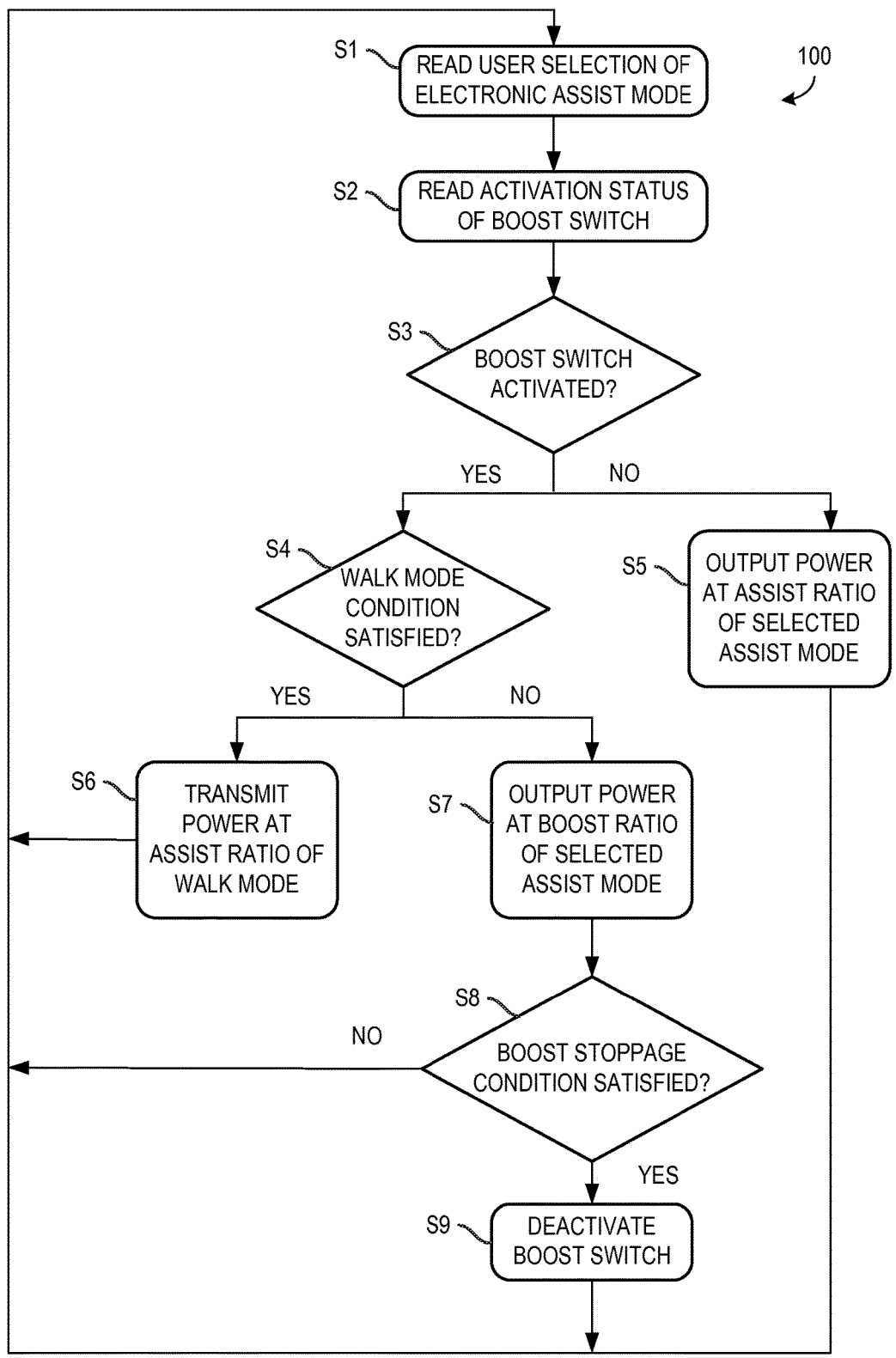
FIG. 4 is a flowchart illustrating the method implemented by program logic executed by the processor of the controller according to one embodiment of the present invention.

Referring to FIG. 4, a flowchart illustrates the method 100 implemented by the program logic executed by the processor of the controller, which receives output from sensors, a second operating device, and first operating device, and sends control signals to a drive motor to cause the drive motor to transmit driving force at a predetermined assist ratio, boost ratio, or walk mode level to a wheel of the bicycle in an electronic assist mode, in accordance with an embodiment of the present disclosure.

At step S1, the controller reads a user selection of the electronic assist mode, which may be a high assist mode, normal assist mode, eco assist mode, or off mode. Alternatively, the electronic assist mode may be an on mode or off mode. At step S2, the controller reads the activation status of the booster switch, or the first operating device. At step S3, the controller determines whether or not the boost switch has been activated. If the boost switch has not been activated, the controller proceeds to cause the drive motor to selectively output driving force at an assist ratio of the selected assist mode (step S5). If the boost switch has been activated, the controller determines whether or not the conditions have been satisfied to selectively output power at a second assist ratio, or the assist ratio of the walk mode (step S4). The predetermined conditions for the walk mode may include a speed of the wheel below a predetermined speed threshold and a torque of the wheel that is below a predetermined torque threshold. If the predetermined conditions for the walk mode have been met, then the controller is configured to change the assist ratio to that of the walk mode when the controller receives the second user input or the first user input after maintaining the assist ratio, so that the driving force of the drive motor is reduced to the second assist ratio, or the assist ratio of the walk mode (step S6). If the predetermined conditions for the walk mode have not been met, then the controller selectively changes a first assist ratio to the boost ratio when the controller receives the first user input in a state in which the controller maintains the first assist ratio, so that the drive motor starts selectively outputting driving force to the wheel of the bicycle at a boost ratio which is higher than an assist ratio based on the first user input (step S7). Alternatively, if the bicycle is in a state in which the controller maintains a second assist ratio, which is the assist ratio of the walk mode, the controller selectively changes the second assist ratio to the first assist ratio when the controller receives the first user input (step S7). It will be appreciated that the boost ratio is greater than the first assist ratio, and the first assist ratio is greater than the second assist ratio. Then, the controller determines whether or not a predetermined boost stoppage condition has occurred (step S8). Under the predetermined boost stoppage condition, the controller is configured to automatically reduce the driving force based on a factor other than the first user input. This factor may at least be one of time, a travel distance of the bicycle, and a number of rotations of a crank shaft. If a predetermined boost stoppage condition has occurred, the controller is configured to deactivate the boost switch, or automatically reduce the driving force from the boost ratio set by the first user input (step S9). Otherwise, the algorithm returns to step S1, where the controller reads a user selection of an electronic assist mode.

Referring to FIG. 5A, depicted are four of the at least ten embodiments of the electronic assist mode configurations of the present invention. Although the off mode is omitted in the tables, it is assumed that all embodiments include the off mode as one of the electronic assist modes. In the first embodiment, the second operating device is configured to transmit a second user input, and in response, cause the controller to cause the drive motor to selectively output driving force at only one predetermined assist ratio; and the first operating device is configured to receive a first user input, and in response, cause the controller to cause the drive motor to start selectively outputting driving force at a one predetermined boost ratio that is higher than the predetermined assist ratio.

In the second embodiment, the second operating device is also configured to transmit a second user input, and in response, cause the controller to cause the drive motor to selectively output driving force at only one predetermined assist ratio; and the first operating device is configured to receive a first user input, and in response, cause the controller to cause the drive motor to start selectively outputting driving force at a one predetermined boost ratio that is higher than the predetermined assist ratio. Additionally, the first operating device is further configured to receive a first user input which includes a first boost input and a second boost input, and the controller sets a first boost ratio in response to the first boost input and sets a second boost ratio in response to the second boost input, where the second boost ratio is greater than the first boost ratio. This causes the driver motor to start selectively increasing the driving force to a first boost ratio upon receipt of the first boost input, and increasing the drive force to the second boost ratio upon receipt of the second boost input. The first boost ratio depends on an assist ratio maintained by the controller just before receiving the first user input, so that the first boost ratio is configured to be greater than the assist ratio just before the driving force is increased to the first boost ratio. In some embodiments, the first operating device may include a lever which may be operable through a first angular range to generate the first boost input and is operable through a second angular range greater than the first angular range to generate the second boost input.

In the third embodiment, the input received by the first operating device causes the controller to cause the drive motor to transmit driving force in one of three predetermined electronic assist modes: a high assist mode, in which the controller selectively increases the driving force from a first assist ratio to a first boost ratio; a normal assist mode, in which the controller selectively increases the driving force from a second assist ratio to the first boost ratio; and an eco assist mode, in which the controller selectively increases the driving force from a third assist ratio to the first boost ratio. The first boost ratio is configured to be greater than the first assist ratio.

In the fourth embodiment, the third embodiment is further configured such that the controller is further configured to receive a second boost input, where the first user input is a first boost input, and in the high assist mode, normal assist mode, and the eco assist mode, the driving force is selectively changed to the first assist ratio after the controller receives the second boost input to cause the drive motor to cease the selective increase of the driving force of the drive motor to the first boost ratio.

Referring to FIG. 5B, depicted are three of the at least ten embodiments of the electronic assist mode configurations of the present invention. Although the off mode is omitted in the tables, it is assumed that all embodiments include the off mode as one of the electronic assist modes. In the fifth embodiment, the third embodiment is further configured such that the controller is further configured to receive a second boost input, where the first user input is a first boost input, and in the high assist mode, normal assist mode, and eco assist mode, the driving force is selectively increased to a second boost ratio after the controller receives the second boost input to cause the drive motor to cease the selective increase of the driving force of the drive motor to the first boost ratio. The second boost ratio is configured to be greater than the first boost ratio. In some embodiments, the first operating device may include a lever which may be operable through a first angular range to generate the first boost input and is operable through a second angular range greater than the first angular range to generate the second boost input.

In the sixth embodiment, the first user input received by the controller causes the controller to cause the drive motor to selectively output driving force in one of three predetermined electronic assist modes: a high assist mode, in which the controller selectively increases the driving force from a first assist ratio (A1) to a first boost ratio, which is an assist ratio multiplied by N, wherein N>1 and N is an integer. Specifically, the first boost ratio is defined as A1×N; a normal assist mode, in which the controller selectively increases the driving force from a second assist ratio (A2) to a second boost ratio defined as A2×N; and an eco assist mode, in which the controller selectively increases the driving force from a third assist ratio (A3) to a third boost ratio defined as A3×N.

In the seventh embodiment, the first user input received by the controller causes the controller to cause the drive motor to selectively output driving force in one of three predetermined electronic assist modes: a high assist mode, in which the controller selectively increases the driving force from a first assist ratio to a first boost ratio; a normal assist mode, in which the controller selectively increases the driving force from a second assist ratio to the first assist ratio; and an eco assist mode, in which the controller selectively increases the driving force from a third assist ratio to the second assist ratio. The first boost ratio is configured to be greater than the first assist ratio.

Referring to FIG. 5C, depicted are three of the at least ten embodiments of the electronic assist mode configurations of the present invention. Although the off mode is omitted in the tables, it is assumed that all embodiments include the off mode as one of the electronic assist modes. In the eighth embodiment, the first user input received by the controller causes the controller to cause the drive motor to selectively output driving force in one of three predetermined electronic assist modes: a high assist mode, in which the controller selectively increases the driving force from a first assist ratio to a first boost ratio; a normal assist mode, in which the controller selectively increases the driving force from a second assist ratio to the first boost ratio; and an eco assist mode, in which the controller selectively increases the driving force from a third assist ratio to the first assist ratio. The first boost ratio is configured to be greater than the first assist ratio.

In the ninth and tenth embodiments, the controller is configured to control a drive motor that is configured to output a driving force under two states: in the first state, the controller is configured to increase the driving force based on a first user input so as to set a boost ratio; in the second state, which is different from the first state based on the first input, the controller is configured to control an electric component without setting the boost ratio in a second state. The first state corresponds to a state in which the user is applying manual drive force, and the second state corresponds to a walk mode, or a state in which the user is not applying manual drive force and the controller determines that a speed of a wheel of the bicycle is below a predetermined speed.

In the ninth embodiment, when the controller determines that the speed of the wheel is below a predetermined speed and the torque of the wheel is below a predetermined torque, then the controller in the predetermined electronic assist mode is configured to control the drive motor to output a predetermined driving force in the second state, which corresponds to the walk mode at a second assist ratio, selectively reducing the driving force of the drive motor from a boost ratio to the second assist ratio. If the user wishes to terminate the walk mode and resume one of the three possible predetermined assist ratios, the controller is configured to receive a second user input, to set an assist ratio from a plurality of assist ratios based on the second user input, and to maintain the assist ratio set by the second user input. It will be appreciated that the controller sets the boost ratio so that the boost ratio is higher than the highest assist ratio among the plurality of assist ratios.

In the tenth embodiment, when the controller determines that the speed of the wheel is below a predetermined speed and the torque of the wheel is below a predetermined torque, then then the controller in the predetermined electronic assist mode is configured to control the drive motor to output a predetermined driving force in the second state, which corresponds to the walk mode, selectively reducing the driving force of the drive motor from a boost ratio. It will be noted that, in this embodiment, there is only one possible assist mode to select, as opposed to a plurality of assist modes in the ninth embodiment. Thus, if the user wishes to terminate the walk mode and resume an assist ratio, the controller is configured to receive a second user input, to set the assist ratio based on the second user input, and to maintain the assist ratio set by the second user input.

The term "comprising" and its derivatives, as used herein, are intended to be open ended terms that specify the presence of the stated features, elements, components, groups, integers, and/or steps. This concept also applies to words of similar meaning, for example, the terms "have", "include" and their derivatives.

The term "bicycle" and its derivatives, as used herein, are intended to be open ended terms that specify any vehicle or machine with a wheel that is propelled by the action of a cyclist's feet upon pedals, and encompasses outdoor bicycles, stationary bicycles, exercise cycles, indoor bicycles, and the like.

The terms of degree such as "approximately" as used herein mean a reasonable amount of deviation of the modified term such that the end result is not significantly changed (e.g., manufacturing tolerances).

While specific embodiments of the bicycle motor output boosting system have been described in detail, the particular arrangements disclosed are meant to be illustrative only and not limiting. The features of the various embodiments described above, as well as modifications thereof, may be variously combined without departing from the scope of this disclosure.

The invention claimed is:

1. A bicycle motor control system, comprising:
   a controller configured to control a drive motor that is configured to output a driving force,
   wherein the controller is configured to receive a first user input, when the drive motor outputs the driving force at a first ratio, and increase the driving force based on the first user input so as to switch from the first ratio to a boost ratio, and automatically reduce the driving force based on a factor other than the first user input so as to switch from the boost ratio to the first ratio; and
   wherein the factor is at least one of time, a travel distance of the bicycle, and a number of rotations of a crank shaft.

2. The bicycle motor control system of claim 1, wherein the first user input is wirelessly transmitted to the controller.

3. The bicycle motor control system of claim 1, wherein the controller is configured to control the drive motor to output the driving force in accordance with a manual drive force.

4. The bicycle motor control system of claim 1, wherein the controller is configured to receive a second user input to set an assist ratio from a plurality of assist ratios based on the second user input, and maintain the assist ratio set by the second user input.

5. The bicycle motor control system of claim 4, wherein the controller is configured to change the assist ratio when the controller receives the second user input or the first user input after maintaining the assist ratio.

6. The bicycle motor control system of claim 4, further comprising:
   at least a first operation switch, and a second operation switch,
   wherein the controller is configured to receive the first user input by operating the first operation switch and to receive the second user input by operating the second operation switch.

7. The bicycle motor control system of claim 4, wherein the controller sets the boost ratio so that the boost ratio is higher than a highest assist ratio among the plurality of assist ratios.

8. The bicycle motor control system of claim 1, wherein the controller communicates with the drive motor via a wired connection.

9. The bicycle motor control system of claim 1, wherein the controller includes a memory which records information about the boost ratio and an assist ratio.

10. A bicycle motor control system, comprising:
    a controller configured to control a drive motor that is configured to output a driving force, wherein
    the controller is configured to receive a first user input and increase the driving force based on the first user input so as to set a boost ratio, and automatically reduce the driving force based on a factor other than the first user input;
    the first user input includes a first boost input and a second boost input;
    the controller sets a first boost ratio in response to the first boost input and sets a second boost ratio in response to the second boost input; and
    the second boost ratio is greater than the first boost ratio.

11. The bicycle motor control system of claim 10, further comprising a lever.

12. The bicycle motor control system of claim 11, wherein the lever is operable through a first angular range to generate the first boost input and operable through a second angular range greater than the first angular range to generate the second boost input.

13. The bicycle motor control system of claim 10, wherein the first boost ratio depends on an assist ratio maintained by the controller just before receiving the first user input.

14. The bicycle motor control system of claim 10, wherein the first boost ratio is an assist ratio multiplied by N, wherein N>1 and N is an integer.

15. A bicycle motor control system, comprising:
    a controller configured to control a drive motor that is configured to output a driving force, wherein
    the controller is configured to receive a first user input and increase the driving force based on the first user input so as to set a boost ratio, and automatically reduce the driving force based on a factor other than the first user input;
    the controller selectively changes a first assist ratio to the boost ratio when the controller receives the first user input in a state in which the controller maintains the first assist ratio;

the controller selectively changes a second assist ratio to the first assist ratio when the controller receives the first user input in a state in which the controller maintains the second assist ratio; and the boost ratio is greater than the first assist ratio, and the first assist ratio is greater than the second assist ratio.

16. A bicycle motor control system, comprising:

a controller configured to control a drive motor that is configured to output a driving force;

wherein, when the drive motor outputs the driving force at a first ratio, the controller is configured to increase the driving force based on a first user input so as to switch from the first ratio to a boost ratio in a first state; and wherein, when the drive motor outputs the driving force in the first state, the controller is further configured to control an electric component, without setting the boost ratio, so as to switch from the first state to a second state that is different from the first state based on the first user input.

17. The bicycle motor control system of claim 16, wherein the controller is configured to receive a second user input, to set an assist ratio from a plurality of assist ratios based on the second user input, and to maintain the assist ratio set by the second user input.

18. The bicycle motor control system of claim 17, wherein the controller sets the boost ratio so that the boost ratio is higher than a highest assist ratio among the plurality of assist ratios.

19. The bicycle motor control system of claim 18, wherein the controller is configured to control the drive motor to output a predetermined driving force in the second state.

20. The bicycle motor control system of claim 16, wherein the first state corresponds to a state in which the user is applying manual drive force, and the second state corresponds to a state in which the user is not applying manual drive force and the controller determines that a speed of a wheel of the bicycle is below a predetermined speed.

* * * * *